US005950293A

United States Patent [19]

Hamilton et al.

[11] Patent Number: 5,950,293

[45] Date of Patent: Sep. 14, 1999

[54] AUTOMOTIVE VALVE SPRING COMPRESSION AND VALVE REPLACEMENT TABLE

[76] Inventors: Terry L. Hamilton; Larry Hamilton, both of 8018 State Rte. 312, Logan, Ohio 43138

[21] Appl. No.: 09/001,526

[22] Filed: Dec. 31, 1997

[51] Int. Cl.[6] .......... B23P 19/04

[52] U.S. Cl. .......... 29/215

[58] Field of Search .......... 29/213 R, 215–221, 29/888.92; 269/61, 60

[56] References Cited

U.S. PATENT DOCUMENTS

| | | | |
|---|---|---|---|
| 1,034,874 | 8/1912 | Clark . | |
| 2,524,949 | 10/1950 | Applegate | 29/219 |
| 2,586,050 | 2/1952 | Jensen . | |
| 2,691,209 | 10/1954 | Stearns | 29/215 |
| 3,053,119 | 9/1962 | Anderson | 269/60 |
| 3,172,653 | 3/1965 | Fredrickson | 269/61 |
| 3,295,193 | 1/1967 | Maness . | |
| 4,513,486 | 4/1985 | Raczek . | |
| 4,779,856 | 10/1988 | Beeler | 269/60 |
| 5,371,932 | 12/1994 | Bryan et al. . | |
| 5,375,308 | 12/1994 | Harris . | |

*Primary Examiner*—Robert C. Watson
*Attorney, Agent, or Firm*—John D. Gugliotta, PE, Esq.

[57] ABSTRACT

An automotive valve spring compression and valve replacement table is provided having a cylinder head support station that is rotationally affixed to a rotation mechanism, or head rotator, allowing for rotation of the supported cylinder head at any position within a full 360 degree rotational arc. A pneumatically operated valve spring clamp is provide capable of compressing and retaining the force of a valve spring. The clamp is supported on a clamp support rail, which allows for horizontal positioning of the clamp. A clamp rail support urging mechanism, or clamp slide, supports the clamp support rail, and allows the user to incrementally adjust the lateral positioning of the clamp.

8 Claims, 6 Drawing Sheets

AUTOMOTIVE VALVE SPRING COMPRESSION AND VALVE REPLACEMENT TABLE

BACKGROUND OF THE INVENTION

1. Field of the Invention

The present invention relates generally to internal combustion engine service and repair equipment and, more particularly, to an engine valve compressing machine which allows for the quick and easy removal of valve springs from engine cylinder heads.

2. Description of the Related Art

In the art of engine service and repair equipment of to internal combustion engines, a wide variety of methods are currently utilized in order to assist a mechanic in the removal and replacement of engine valves and valve springs. Due to the tremendous urging forces provided by the valve lifter springs, removing these valves can require far more force than can be generated by the unaided hand. As a result, hand held air clamps and manual screw clamps are used in a widespread manner to accomplish this task.

In the related art, other methods of providing a pneumatic assistance device for this task are known. A search of the prior art did not disclose any patents that read directly on the claims of the instant invention; however, the following references were considered related:

U.S. Pat. No. 1,034,874, issued in the name of Clark, discloses a device for removing automotive valve springs wherein a lever arm is used to compress the valve spring in order to remove it. The device includes a hook support attached to the lever via a chain that, when placed against the valve head, places the fulcrum of the lever arm upon the valve head, allowing the spring to be compressed without actuating the valve.

U.S. Pat. No. 2,586,050, issued in the name of Jensen, and U.S. Pat. No. 3,295,193, issued in the name of Maness, disclose a devices for removing automotive valve springs wherein a pry bar-like lever arm is used to compress the springs for removal either from the stem-side or from the headside of the valve assembly. These devices place the fulcrum of the lever arm upon the cylinder head or other structural member of the automobile engine.

The inventions disclosed in the '874, '050, and '193 all suffer from drawbacks that distinguish them from the present invention and illustrate the novel and advantageous features of the present invention. First, these devices are designed to manually compress a single valve spring, requiring the user to repeatedly perform the operation on a multitude of valves, spending a great deal of time. Second, these devices are all manually operated, requiring the user to exert his own energy in compressing the valve springs for their removal and can amount to an extraordinarily large task when repeated on a multitude of valve springs. Finally, the fact that these lever-arm type devices place the fulcrum directly on the engine structure creates the risk of damaging engine parts during their use.

U.S. Pat. No. 5,375,308, issued in the name of Harris, discloses a device for removing automotive valve springs wherein a pneumatic compression device, powered by a compressed air source, is used to compress the valve spring so that it can be removed. Although this device relieves the user of the burden of having to manually compress the spring and limits the possibility of damaging the engine structure with a lever-arm type device, this device can only be used on one spring at a time, requiring repeated use. It also requires the use of large, expensive compressor units and forces the user to manage a bulky hose.

U.S. Pat. No. 5,371,932, issued in the name of Bryan et al., discloses a device for removing automotive valve springs wherein an engine cylinder head is placed upon the table portion of the device and secured thereto. A compression plate, connected to a hydraulic actuator is mounted above the table and, when activated, fits over the entire row valve springs, compressing all of them at the same time and allowing for their removal. The table portion rotates along an axis parallel to the length of the cylinder head so as to allow for use with varying valve angles. This invention, however, is inadequate due to the fact that it will accommodate only cylinder heads that contain valves in a single row and of a limited size. Many modern engine designs incorporate the use of multiple valves per single cylinder, thus resulting in a non linear arrangement that this device will not accommodate.

Finally, U.S. Pat. No. 4,513,486, issued in the name of Raczek, discloses a valve retainer for automotive valve repair wherein the device is secured within the engine cylinder by screwing it into the spark plug threads. Once inserted, the device can be actuated so that a lever arm rests upon the valve head, preventing it from opening and thus allowing the valve spring to be compressed without opening the valve. This device, however, does not include any means for compressing or removing the valve spring, and thus does not address the purpose of the present invention as it does not perform a like function.

While some features are incorporated into this invention in combination, other elements are different enough as to make the combination distinguished over the related art. Consequently, a need has therefore been felt for an engine valve compressing machine which allows for the quick and easy compression and removal of valve springs from engine cylinder heads.

SUMMARY OF THE INVENTION

Therefore, it is an object of the invention to indicate a device of the type disclosed above which avoids the disadvantages inherent in the state of the art. In particular, the device is to be capable of supporting and engine cylinder head in such a manner that the cylinder head is easily accessible from any direction, as well as be capable of compressing engine valve springs prior to removal of the engine valves.

It is therefore an object of the present invention to provide an improved automotive valve spring compression and valve replacement table.

It is a feature of the present invention to provide an improved automotive valve spring compression and valve replacement table that utilizes a pneumatically operated valve spring clamp capable of compressing and retaining the force of a valve spring.

It is a further feature of the present invention to provide such a table that allows for lateral positioning of the clamp as well as the rotational adjustment of cylinder head.

Briefly described according to the preferred embodiment of the present invention, an automotive valve spring compression and valve replacement table is provided having a cylinder head support station that is rotationally affixed to a rotation mechanism, or head rotator. This allows for rotation of the supported cylinder head at any position within a full 360 degree rotational arc. A pneumatically operated valve spring clamp is provided capable of compressing and retaining the force of a valve spring. The clamp is supported on a clamp support rail, which allows for horizontal positioning of the clamp. A clamp rail support urging mechanism, or clamp slide, supports the clamp support rail, and allows the user to incrementally adjust the lateral positioning of the clamp.

An advantage of the present invention is that a cylinder head is supported in a rotational fashion, allowing for full rotation of the cylinder head and leading to complete access to all sides of the cylinder head.

Another advantage of the present invention is that the valve spring clamp is slidably retained such as to allow the clamp to be positioned accurately in both horizontal and lateral planes.

Further, a preferred embodiment of the present invention has can provide for a hands-free clamp operation by a foot operated pneumatic supply mechanism.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 3:
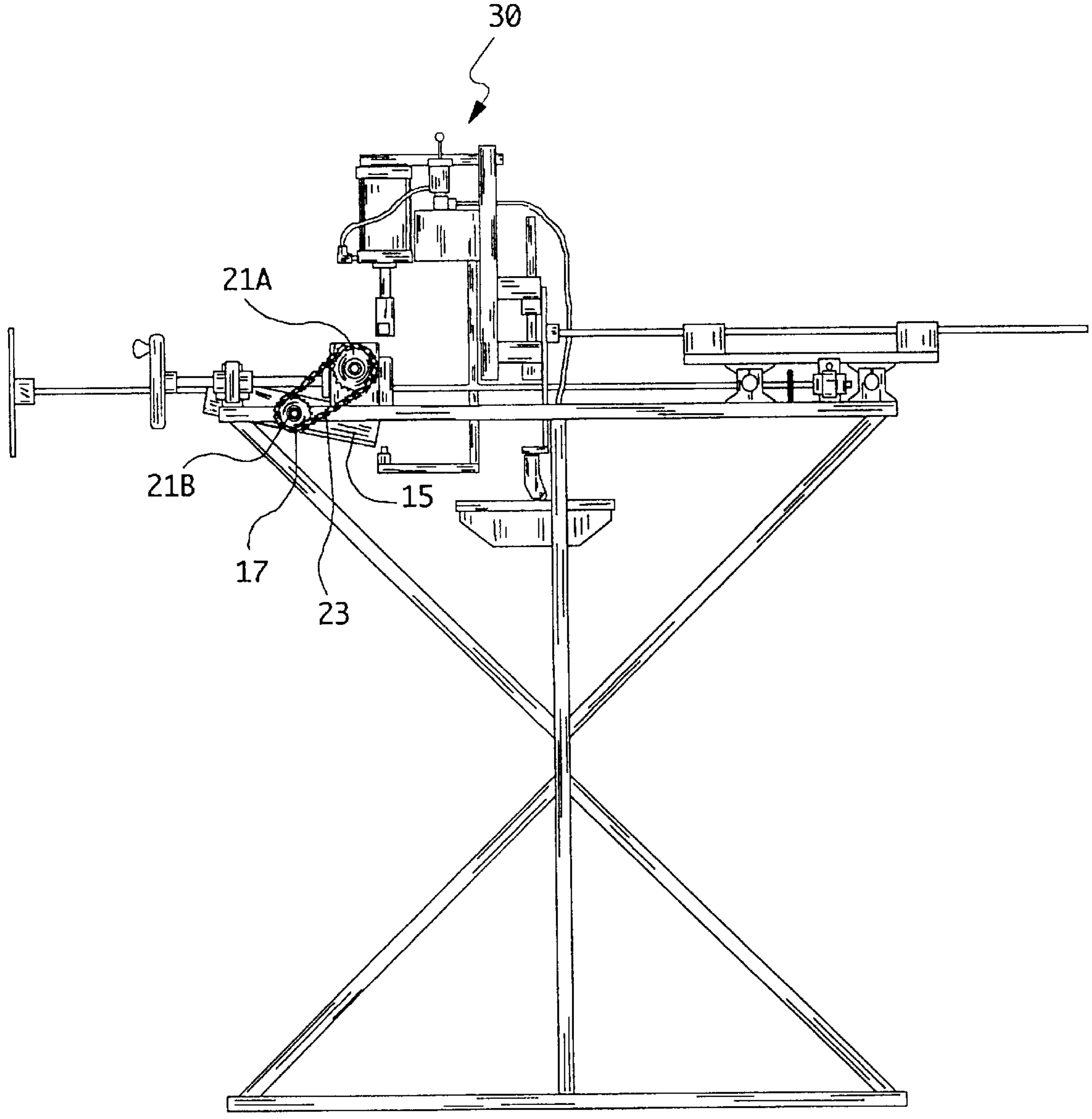
FIG. 3 is a right side elevational view thereof.

Referring now to the figures, an automotive valve spring compression and valve replacement table, generally noted as 10, is provided having a cylinder head support station 15 rotatably supported about an axle 17. The axle 17 is affixed to a rotation mechanism, or head rotator 20. As best depicted in FIG. 3, the head rotator 20 is shown in it preferred embodiment as a rotational adjustment handle 22 in physical communication with the axle 17 through the use of a first gear 21*a* and a second gear 21*b*, both circumscribed by a drive chain 23. When an engine cylinder head is support on and clamped to the cylinder head support station 15, this head rotator 20 allows for rotation of the supported cylinder head at any position within a full 360 degree rotational arc. The user can adjust this rotational position by adjustment of the rotational adjustment handle 22.

A pneumatically operated valve spring clamp 30 is provided capable of compressing and retaining the force of an automobile valve spring. The clamp 30 is supported on a clamp support rail 32 in a slidable manner. This allows for horizontal positioning of the clamp 30 relative tho the cylinder head support station such that the clamp 30 can be positioned at various locations along a mounted cylinder head. This allows for an easy transition between various cylinder positions along the cylinder head. A clamp rail support urging mechanism, or clamp slide 40, supports the clamp support rail 32, and allows the user to incrementally adjust the lateral positioning of the clamp 30.

Figure 1:
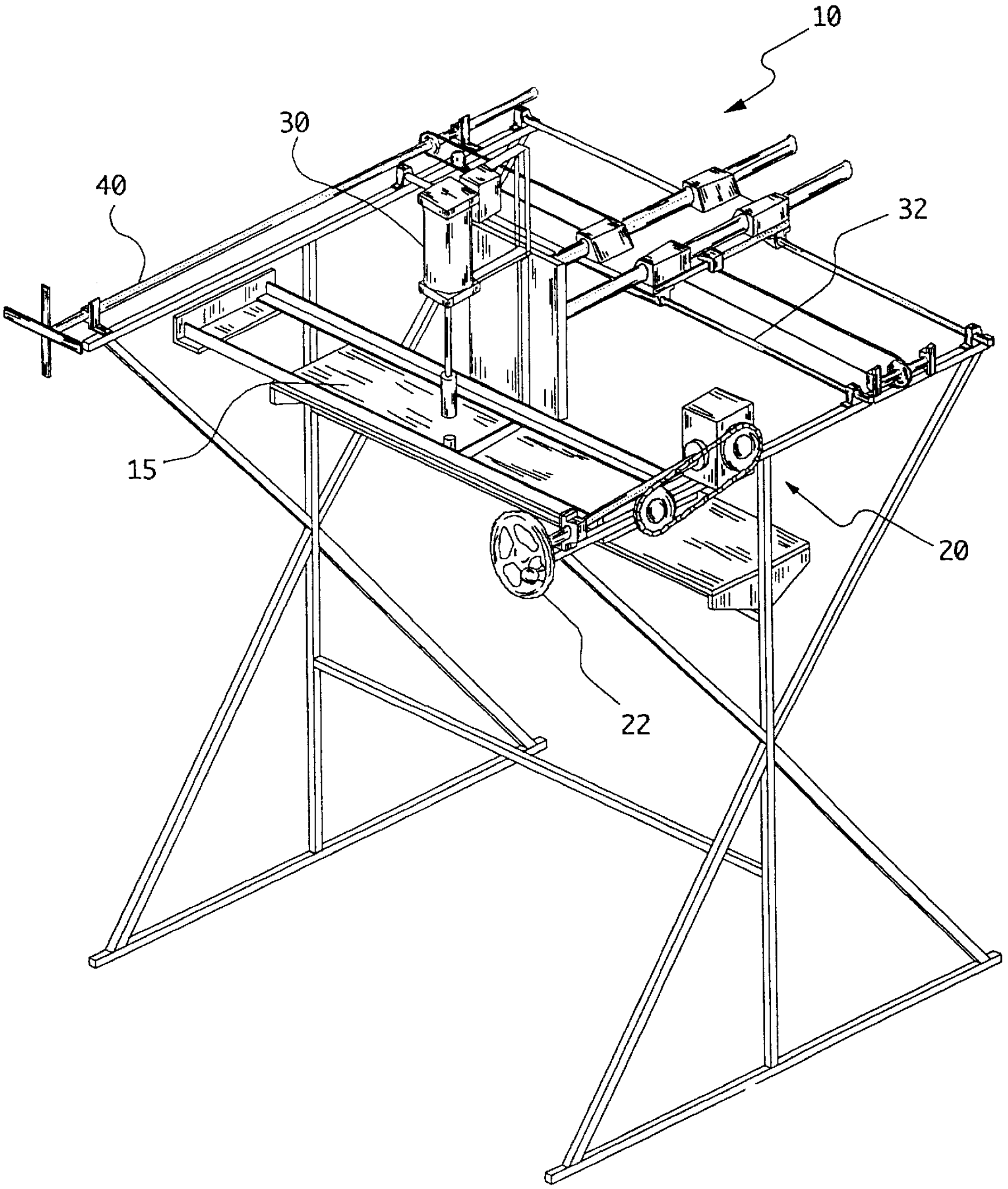
FIG. 1 is a perspective view of an automotive valve spring compression and valve replacement table according to the preferred embodiment of the present invention.
Figure 2:
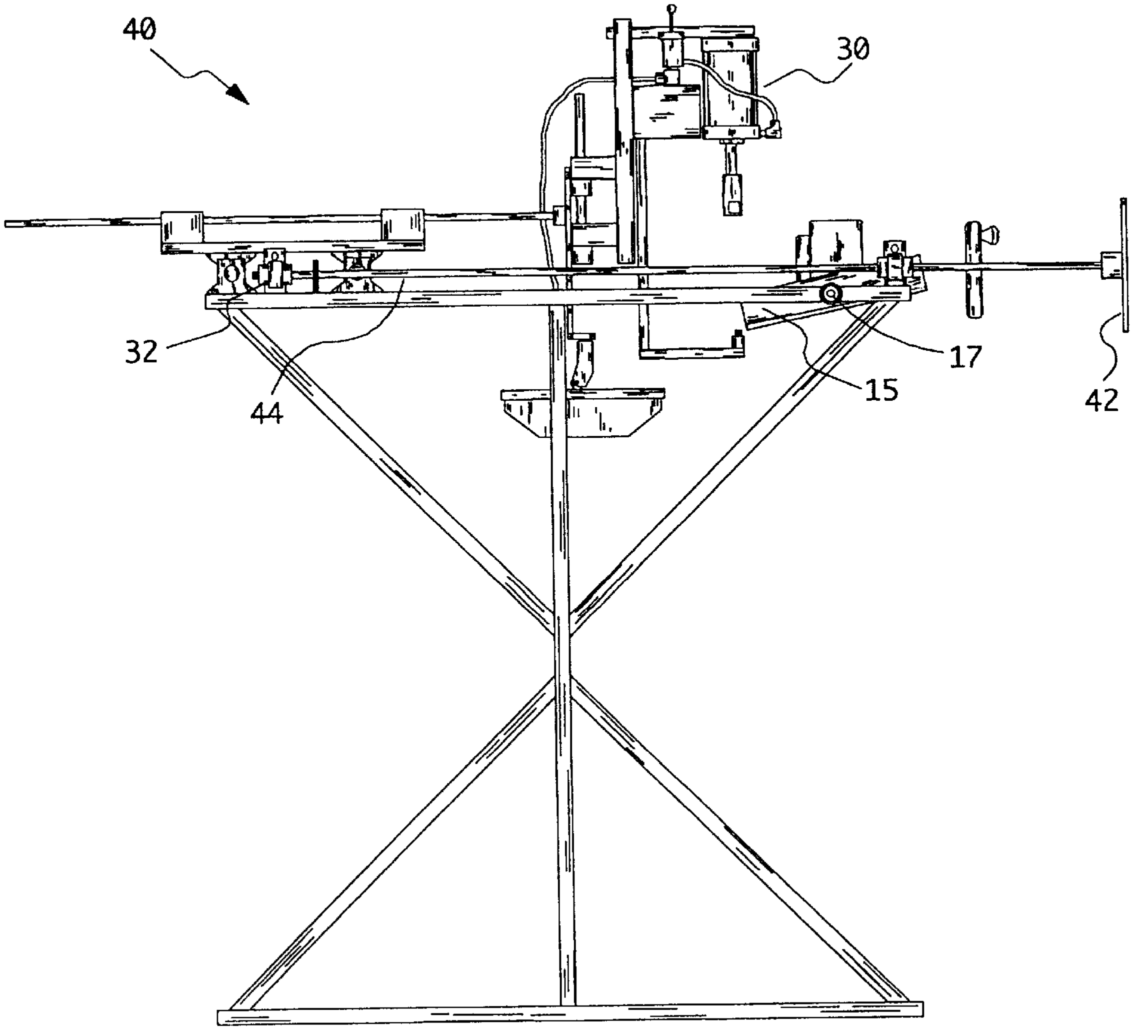
FIG. 2 is a left side elevational view thereof.

As best depicted in FIG. 2, the clamp slide 40 is shown in it preferred embodiment having a clamp slide adjustment handle 42 in physical communication with the clamp support rail 32 through the use of a drive axle 44. When an engine cylinder head is support on and clamped to the cylinder head support station 15, this clamp slide 40 allows for the urging of the clamp laterally relative to the supported cylinder head.

Figure 4:
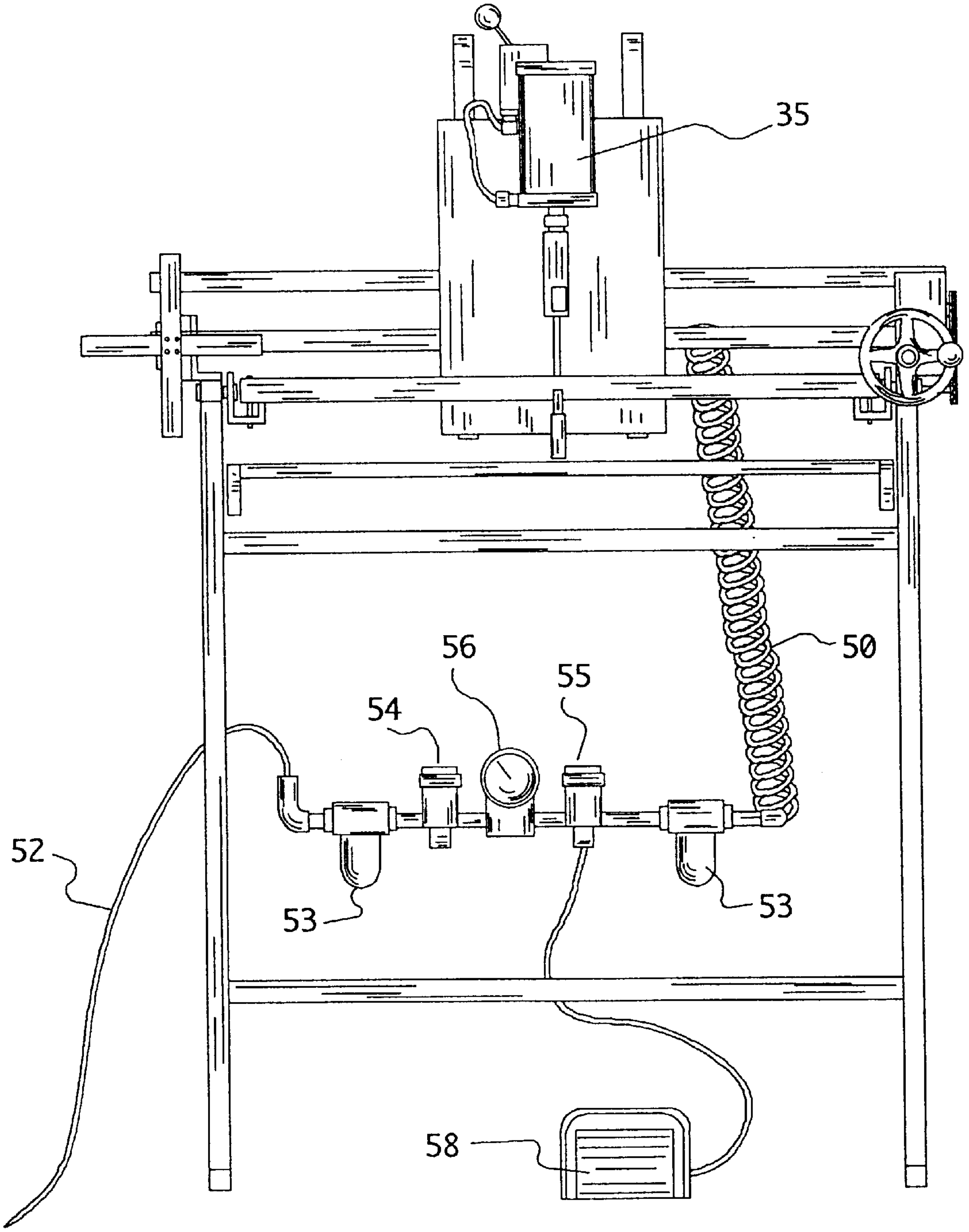
FIG. 4 is a front elevational view thereof, wherein is shown in detail a pneumatic supply mechanism for use therewith.
Figure 5:
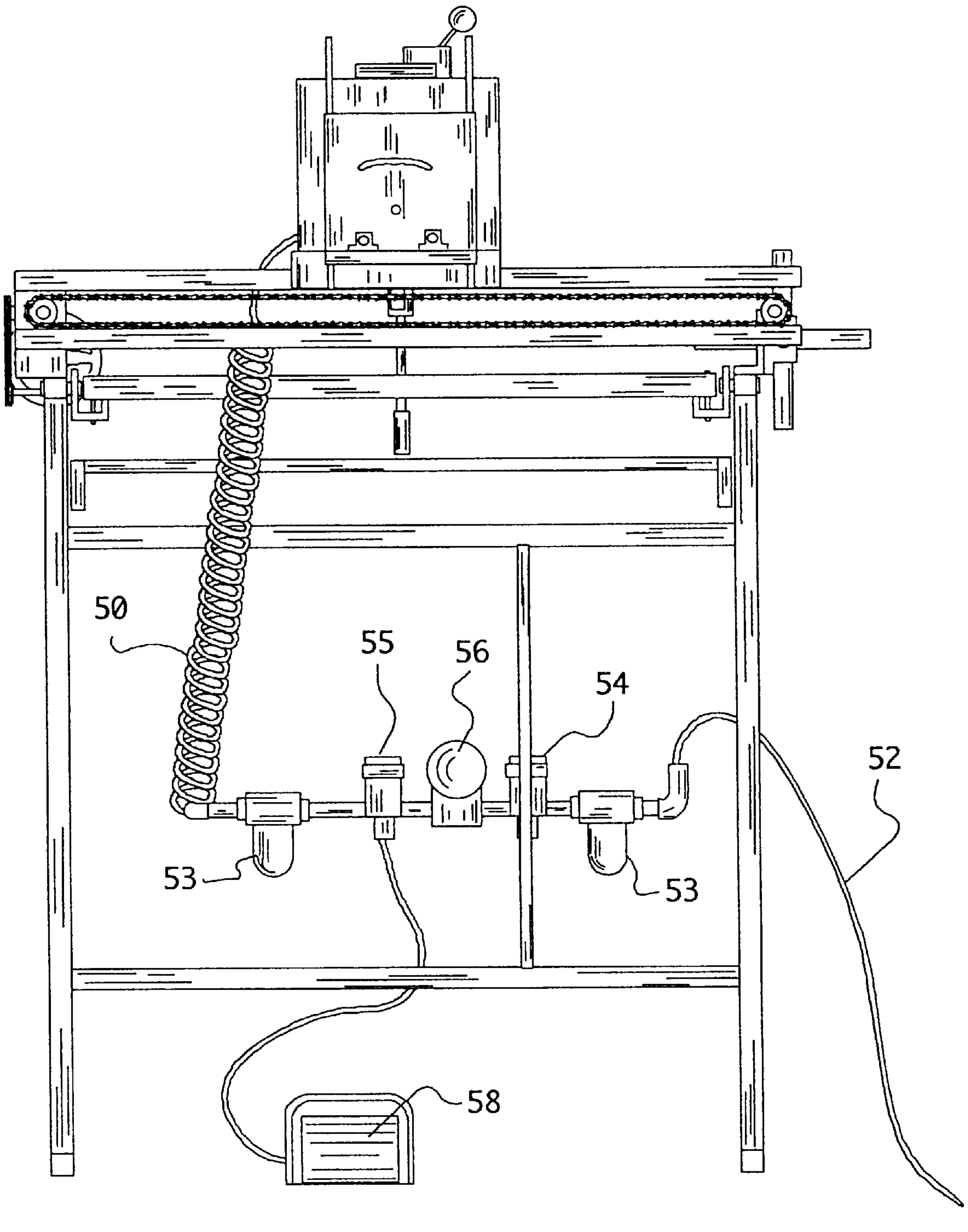
FIG. 5 is a rear elevational view of the mechanism depicted in FIG. 4.

As shown in FIG. 4 and FIG. 5, a pneumatic supply mechanism 50 for remote operation of the clamp 30 is shown in one, preferred embodiment. Compressed air from a conventional source in fluid communication with the driving piston 35 of the clamp 30 is utilized to supply the motive force for driving the clamp 30. An air supply conduit 52 communicates compressed air through a series of filters 53, regulators 54, and solenoids 55. An air pressure gauge 56 is also provided for allowing the user to adjust the supply air pressure. An electrically operated foot switch 58 communicates with the shutoff solenoid 55, and thereby allows for a hands-free clamp operation by a foot operated pneumatic supply mechanism.

2. Operation of the Preferred Embodiment

Figure 6:
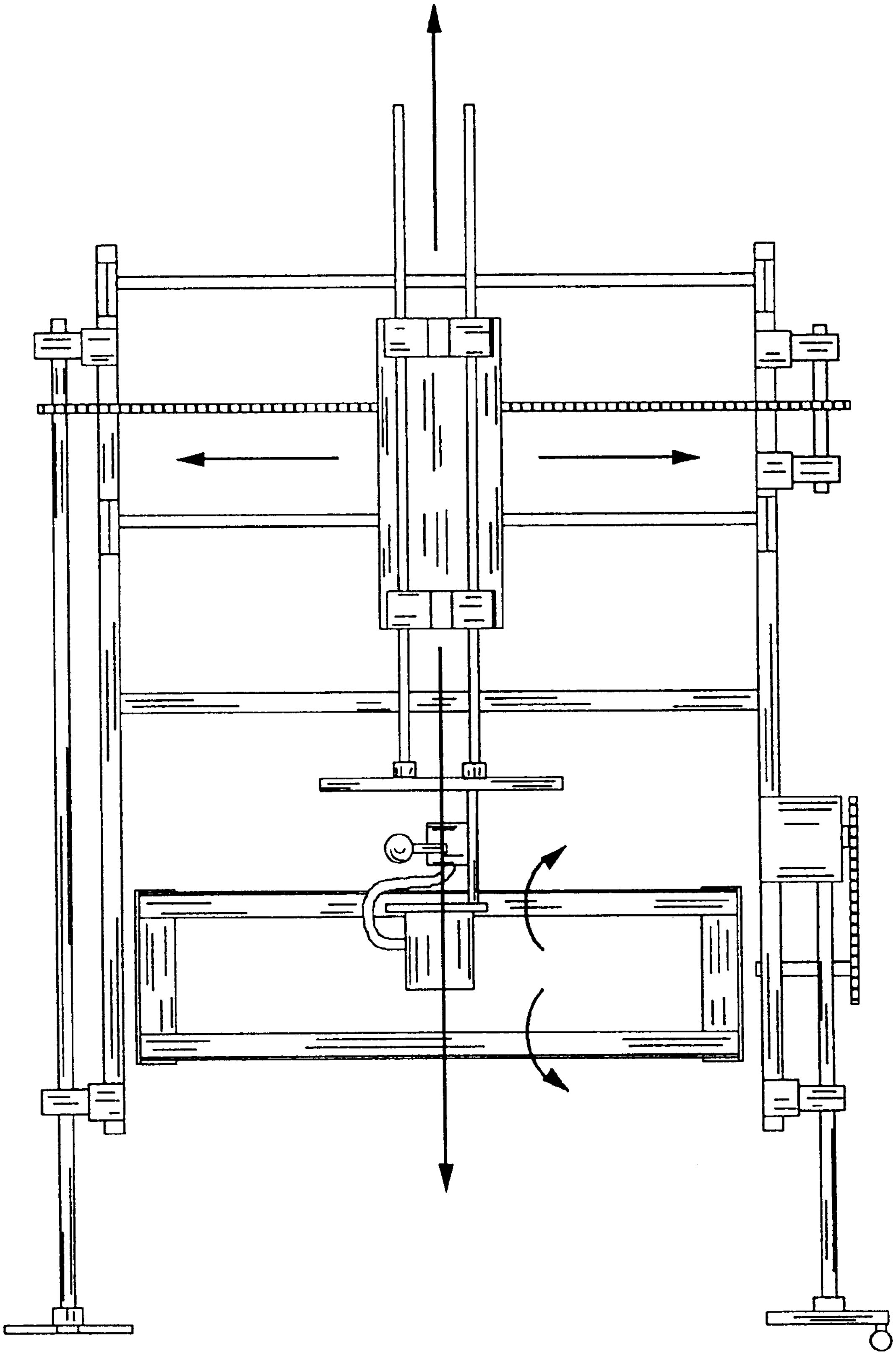
FIG. 6 is a top plan view thereof.

To use the present invention for facilitating the repair or replacement of internal combustion engine valves, the cylinder head is removed from the engine and placed atop the automotive valve spring compression and valve replacement table cylinder head support station. It is envisioned that the cylinder head can be clamped in place utilizing conventional clamping means. The cylinder head is now affixed to the head rotator, and can be rotated to any position within a full 360 degree rotational arc. As best indicated in FIG. 6, the pneumatically operated valve spring clamp is then positioned over the desired cylinder by laterally adjusting the clamp along the clamp support rail, and horizontal positioning the clamp by adjusting the clamp slide. The clamp is incrementally adjusted to the proper position in this manner. Finally, the clamp can be activated utilizing the foot pedal, in which the clamp depresses the engine valve in a manner to fully compress the valve spring. While the spring is compressed in this hands-free manner, the user can remove the valve retaining rings and release the clamp to allow for the free removal of valves, rods, springs, etc.

The foregoing description is included to illustrate the operation of the preferred embodiment and is not meant to limit the scope of the invention. The scope of the invention is to be limited only by the following claims.

What is claimed is:

1. An automotive valve spring compression and valve replacement table comprising:

a cylinder head support station for holding and supporting the cylinder head of an internal combustion engine. said cylinder head support station being rotatable supported about an axle:

a rotation mechanism in direct physical communication with said axle, said rotation mechanism including a rotational adjustment handle such that rotational motion of said handle translates directly into rotation of the supported cylinder head at any position within a full 360 degree rotational are, wherein said rotation mechanism further comprises a first gear in physical communication with said axle, a second gear in physical communication with said rotational adjustment handle, and a drive chain, said drive chain circumscribing both said first gear and said second gear such as to provide simultaneous physical communication between said first gear and said second gear;

a valve clamp capable of urging an engine valve against its valve spring such as to facilitate removal of said cylinder valve and said valve spring:

a clamp support rail for supporting said valve clamp in a manner alignable with said cylinder head support station; and a clamp slide adjustment handle in physical communication with said clamp support rail through a drive axle such that when an engine cylinder head is support on and clamped to said cylinder head support station said clamp slide allows for the urging of the clamp laterally relative to the supported cylinder head:

and wherein said clamp is supported on a clamp support rail in a slidable manner for allowing horizontal positioning of the clamp relative tho the cylinder head support station such that the clamp can be positioned at various locations along a mounted cylinder head, thereby allowing for an easy transition between various cylinder positions along the cylinder head.

2. The automotive valve spring compression and valve replacement table of claim 1, wherein said valve clamp further comprises:

a valve clamp driving mechanism;

a pneumatically operated piston for urging said valve clamp in a linearly reciprocating motion;

a pneumatic supply mechanism in fluid communication with said pneumatically operated piston for remote operation of the clamp, and wherein compressed air from a conventional source is provided in fluid communication with said driving piston to supply the motive force for driving the clamp, and wherein said pneumatic supply mechanism comprises:

an air supply conduit for communicating compressed air;

at least one filters in fluid communication with said air supply conduit, said filter for removing oil, moisture, and impurities from the air supplied by said air supply conduit;

a regulator in fluid communication with said air supply conduits for allowing adjustments in the pressure of air supply; and at least one solenoid in fluid communication with said air supply conduit for allowing the user to cease the flow of supply air.

3. The automotive value spring compression and value replacement table of claim 2, further comprising:

an electrically operated switch for communicating with said shutoff solenoid.

4. The automotive value spring compression and value replacement table of claim 3, wherein said switch comprises a foot operated switch, thereby allowing for a hands-free clamp operation.

5. The automotive valve spring compression and valve replacement table of claim 1, wherein said valve clamp further comprises a valve clamp driving mechanism.

6. The automotive valve spring compression and valve replacement table of claim 5, wherein said valve clamp driving mechanism comprises a pneumatically operated piston for urging said valve clamp in a linearly reciprocating motion.

7. The automotive valve spring compression and valve replacement table of claim 1, wherein a clamp rail support urging mechanism clamp slide supports said clamp support rail and allows the user to incrementally adjust the lateral positioning of said clamp.

8. The automotive valve spring compression and valve replacement table of claim 6, further comprising:

a pneumatic supply mechanism in fluid communication with said pneumatically operated piston for remote operation of the clamp.

* * * * *